United States Patent Office
3,446,871
Patented May 27, 1969

3,446,871
NICKEL COMPOUNDS
Perry L. Maxfield, Durango, Colo., assignor to Phillips Petroleum Company, a corporation of Delaware
No Drawing. Filed Dec. 30, 1966, Ser. No. 606,014
Int. Cl. C07f 15/04, 9/68, 9/90
U.S. Cl. 260—683.15        12 Claims

ABSTRACT OF THE DISCLOSURE

Complex nickel compounds of the formula

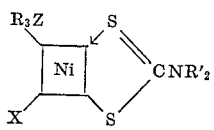

where R and R′ are hydrocarbyl radicals, Z is one of phosphorus, arsenic, or antimony and X is halogen, prepared by reacting nickel halides, $R_3Z$ ligand-forming compounds where R and Z are as defined, and either alkali metal dihydrocarbyldithiocarbamates or substituted or unsubstituted ammonium dihydrocarbyldithiocarbamates convert olefins to higher molecular weight derivatives thereof.

---

This invention relates to new nickel compounds and the compositions thereof and the preparation and use of these compounds.

Nickel and nickel compounds, both inorganic and organometallic, are known to be effective catalysts or catalyst components in numerous applications. It is also known that the nickel valence state, the nature of coordinated sub groups and the structural configuration of complex organometallic nickel derivatives significantly influence the degree and quality of catalytic activity possessed by these compounds.

I have found a new class of nickel compounds that are relatively stable, even in air, and that are particularly suitable as catalysts and catalyst components for the production of polymers, oligomerization of olefin hydrocarbons and hydrocarbon isomerization.

It is therefore one object of this invention to provide a new nickel catalyst for hydrocarbon isomerization. Another object of this invention is to provide a new nickel polymerization catalyst component. It is yet another object of this invention to provide a stable nickel compound suitable as an olefin oligomerization catalyst component. It is another object of this invention to provide a method for producing catalytically active nickel compounds. It is yet another object of this invention to provide a method for producing a new nickel compound for polymerizing, isomerizing and oligomerizing hydrocarbons. It is another object of this invention to provide a new catalyst composition for converting hydrocarbons. It is yet another object of this invention to provide a method for converting hydrocarbons. It is another object of this invention to provide a method for oligomerizing olefin hydrocarbons. It is yet a further object of this invention to provide a method for converting olefin hydrocarbons to higher molecular weight derivatives thereof.

Other aspects, object and the several advantages of this invention will be apparent to one skilled in the art from a study of this disclosure and the appended claims.

In accordance with one embodiment of this invention there is provided a compound having the general formula

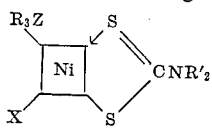

wherein R and R′ are alkyl, aryl, or cycloalkyl radicals and combinations thereof such as aralkyl, and alkaryl, having from 1 to 12 carbon atoms; Z is phosphorus, arsenic or antimony; and X is a halogen.

These compounds are prepared by reacting a suitable nickel halide with a trivalent phosphorus, arsenic or antimony hydrocarbon compound and a suitable dihydrocarbyl substituted dithiocarbamate. All nickel halides are suitable in this application. However, in the presently preferred embodiment of this invention, nickel bromides and chlorides are preferred as starting materials. Suitable ligands are, for example, Triphenylphosphine
Trimethylstibine
Tributylphosphine
Tri(2-ethylhexyl)phosphine
Diethylphenylphosphine
Tricyclopentylarsine
Tribenzylstibine
Tri-p-tolylphosphine
Triethylarsine
Tridodecylphosphine and the like, and mixtures thereof.

The presently preferred dithiocarbamates are alkali metal dihydrocarbyldithiocarbamates, ammonium dihydrocarbyldithiocarbamates and alkyl ammonium dihydrocarbyldithiocarbamates. Although any alkali metal is satisfactory, the sodium derivatives are presently preferred. The hydrocarbon radicals can be either alkyl, aryl, cycloalkyl, and combinations such as aralkyl and alkaryl, preferably having from 1 to about 12 carbon atoms. However, the presently preferred compounds are those in which the hydrocarbon radical is in alkyl having from 1 to about 6 carbon atoms. Where alkyl ammonium dihydrocarbyldithiocarbamates are employed, the alkyl radicals which are bonded to nitrogen preferably have from 1 to about 6 carbon atoms.

Examples of suitable dihydrocarbyldithiocarbamates are:

Sodium dimethyldithiocarbamate
Potassium diethyldithiocarbamate
Sodium methylethyldithiocarbamate
Ammonium dicyclohexyldithiocarbamate
Methylammonium diphenyldithiocarbamate
Potassium di-o-tolyldithiocarbamate
Sodium dibenzyldithiocarbamate
Ammonium di(2-ethylhexyl)dithiocarbamate
Triethylammonium dibutyldithiocarbamate
Trihexylammonium dimethyldithiocarbamate
Sodium didodecyldithiocarbamate These can be employed in the anhydrous form or as the corresponding hydrated salts.

The nickel complexes of this invention can be prepared by contacting the nickel salt, ligand forming material and dithiocarbamate in the presence of a suitable solvent, preferably a polar organic solvent at a slightly elevated temperature to promote reaction. Numerous solvents can be employed, examples of which are methanol, ethanol, ethyl ether, isopropanol, ethyl acetate, chlorobenzene, and the like, and mixtures thereof. Reaction temperature can vary widely, although temperatures within the range from about 25 to about 100° C. are presently preferred. Reaction is initiated almost immediately and is allowed to continue for a period depending upon the degree of conversion desired. Suitable reaction times, are for example, within the range of from about 2 to about 200 minutes.

Various relative concentrations of reactants are of course possible, although it has been found that the most efficient utilization of reactant of materials is accomplished where approximately equimolar quantities are employed. In addition, it is preferred that the concentration of reactants relative to solvent be such that essentially all reactant materials dissolve in the diluent at operating conditions.

In some instances it is also preferred that the production of these nickel compounds be carried out in the substantial absence of oxygen under an inert atmosphere, such as for example, a nitrogen blanket.

The complex nickel compound can be recovered by conventional methods. The compound generally precipitates from the reactant solution after which it can be recovered by filtration, centrifugation or other suitable means. The product is then further purified by washing with fresh solvent and/or recrystallizing from a solvent having higher affinity for the product, such as for example, benzene.

The preparation of the compounds of this invention by the presently preferred method is illustrated by the following examples.

EXAMPLE I

A 2.1 g. quantity of $NiBr_2$ (0.01 mole), 2.6 g. triphenylphosphine (0.01 mole), and 2.2 g. sodium diethyldithiocarbamate trihydrate were introduced into a stirred flask containing 50 ml. absolute ethanol and heated on a water bath at 50° C. for 30 minutes. The reaction was carried out under a nitrogen atmosphere. Four grams of the product, diethyldithiocarbamato(triphenylphosphine)bromonickel, were recovered (75% yield) by decanting the supernatant liquid from the product crystals, washing the product crystals with warm ethanol, then drying the crystals. After additional purification which consisted of dissolving the product in benzene, centrifuging, decanting, and removing the benzene by a flow of nitrogen, the product was subjected to elemental analysis with the following results.

*Analysis.*—Calculated (wt. percent): Ni, 10.70; Br, 14.56; N, 2.56; C, 50.38; H, 4.59. Found: Ni, 10.1; Br, 14.2; N, 2.6, C, 51.0; H, 4.2.

An infrared spectrum of the product was found to be consistent with the indicated identity of the product. The presence of triphenylphosphine was observed by bands at $6.75\mu$, $9.2\mu$, $13.40\mu$, $14.4\mu$.

EXAMPLE II

The procedure used in Example I was repeated using 2.2 g. (0.01 mole) dimethylammonium dimethyldithiocarbamate in the place of sodium diethydithiocarbamate·$3H_2O$.

A violet, crystalline material precipitated. After being purified as in Example I, it was analyzed with the following results.

*Analysis.*—Calculated (wt. percent): Ni, 11.27; N, 2.69; H, 4.06. Found: Ni, 10.6; N, 2.6; H, 4.2.

An infrared spectrum of this material was consistent with the indicated identity of the product and the same absorption lines characteristic of triphenylphosphine were found. Differences in the spectra between the products of Examples I and II distinguished between the ethyl and methyl dithiocarbamate units bonded to the nickel atom. The product was diethyldithiocarbamate(triphenylphosphine)bromonickel.

EXAMPLE III

A run similar to that in Example I was carried out using 4.1 g. (0.02 mole) of tributylphosphine in place of triphenylphosphine. The ethanol was vacuum distilled, leaving a deep red solid. The solid was redissolved in an ethyl ether-pentane mixture, filtered, and the solution chilled to separate out crystals of diethyldithiocarbamato(tributylphosphine)bromonickel.

By substituting tri-n-butylphosphine for triphenylphosphine as the ligand, a complex much more soluble in the organic liquids, especially in hydrocarbons, was formed. This is an advantage in certain reactions for which a homogeneous reaction system is desired.

Numerous other dithiocarbamato nickel complexes can be prepared by employing the various starting materials as above defined. Exemplary of additional compounds which can be prepared within the concept of this invention are:

Dibutyldithiocarbamato(trimethylstibine)bromonickel
Methylpentyldithiocarbamato(tributylphosphine)chloronickel
Diphenyldithiocarbamato(diethylphenylarsine)bromonickel
Dibenzyldithiocarbamato(tricyclopentylphosphine)chloronickel
Dipropyldithiocarbamato(triphenylstibine)bromonickel
Dimethyldithiocarbamato(tribenzylphosphine)iodonickel
Diethyldithiocarbamato(triethylphosphine)chloronickel
and the like.

The dithiocarbamato nickel halide compounds of this invention are suitable for polymerizing olefins in the presence of an organometallic halide corresponding to the formula $$R_aAlX_b$$

wherein R and X are as previously defined and $a$ and $b$ are integers, the sum of which equals 3 and neither $a$ nor $b$ is 0.

Broadly, the process of this invention is applicable to the dimerization of cyclic and acylic olefins having from 2 to about 20 carbon atoms, preferably having up to 12 carbon atoms per molecule or more. The olefinic bond can be terminal or internal, and the olefin can be branched or unbranched, but the branching is preferably no nearer the double bond than the 3-position. Some specific examples of suitable olefins are:

Ethylene
Propylene
Butene-1
Butene-2
Pentene-1
Pentene-2
Cyclopentene
Cyclohexene
3-methylbutene-1
Cycloheptene
Hexene-2
Heptene-1
Cyclooctene
4,4-dimethylheptane-2
Decene-1
Dodecene-1 and the like, and mixtures thereof.

The second components of the catalyst system are organoaluminum compounds which are well known in the art and are prepared by conventional methods. Some examples of the organoaluminum component of the catalyst system are:

Ethylaluminum dichloride
Diethylaluminum chloride
Dimethylaluminum bromide
Phenylaluminum dichloride
Dioctylaluminum iodide
Decylaluminum dibromide
Dibenzylaluminum chloride
Di-p-tolylaluminum iodide and the like, and mixtures thereof. Some of the above compounds are available in combined form such as methylaluminum sesquichloride and ethylaluminum sesquichloride.

The above-mentioned first and second catalyst components are generally combined, for use in this invention, in proportions in the range of from about 0.5:1 to about 20:1 moles of the aluminum component for each mole of the nickel component. An excess of the aluminum component is frequently desirable to scavenge catalyst poisons which might be in the system.

The catalyst is prepared by combining the first and second catalyst components under conditions of time and temperature which permit the catalytically active reaction mixture to be formed. This combination occurs very readily and, in general, the components can be mixed at any temperature within the range of —80 to about 100° C. for a few seconds or for periods of up to several hours in the presence of a diluent in which both the components are at least partially soluble. Any convenient diluent such as benzene, chlorobenzene, methylene chloride, ethylene chloride, tetrahydrofuran, and the like can be used for this purpose. Halogenated diluents are frequently preferred. The mixing of the two catalyst components is carried out in the substantial absence of air or moisture, generally in an inert atmosphere. After the catalytic reaction mixture is formed, it need not be isolated, but can be added directly to the reaction zone as a dispersion in its preparation diluent. If desired, the catalyst components can be separately added, in any order, to the reaction zone either in the presence or absence of the feed olefin.

According to the process of the invention, the olefin or mixture of olefins to be converted is contacted with the catalyst system at any convenient temperature within the board range of —80 to about 150° C., preferably from about 0 to about 100° C. at any convenient pressure which is sufficient to maintain a liquid phase. It is frequently desirable, however, to carry out the reaction under some pressure, and pressures up to about 2,000 p.s.i.g., preferably 20–500 p.s.i.g., can be used. If desired, the conversion can be carried out in the presence of a diluent such as that used for the catalyst preparation. The time of contact will depend upon the desired degree of conversion but will, generally, be in the range of from about 0.1 minute to 20 hours, preferably 5–120 minutes. The proportion of catalyst composition to olefin feed in the reaction zone will generally be in the range of from about 0.001 to about 0.1 mole of nickel complex per mole of olefin feed.

Any conventional contacting technique can be utilized for the olefin dimerization, and batchwise or continuous operation can be utilized. After the reaction period, the products can be separated and/or isolated by conventional means such as by fractionation, crystallization, adsorption, and the like. Unconverted feed material or products not in the desired molecular weight range can be recycled. If desired, the catalyst can be destroyed by treatment with water or alcohol prior to the separation of the products. In some cases, after separation of the olefins, the catalyst can be recycled to the reaction zone.

A more comprehensive understanding of the invention may be obtained by referring to the following illustrative examples which are not intended, however, to be unduly limitative.

EXAMPLE IV 0.1 g. of the purified nickel compound of Example I was dissolved in 10 ml. methylene chloride at room temperature. A 0.5 ml. quantity of ethylaluminum dichloride was then added. The reaction vessel was cooled in an ice bath, 20 ml. of cyclopentene was then added, and the mixture was stirred for a period of 30 minutes during which the reaction vessel remained immersed in the ice bath. The reaction mixture was then sampled, analyzed, and dimers of cyclopentene such as 1-cyclopentylcyclopentene were found to be present.

EXAMPLE V

Another run was made at conditions essentially identical to those of Example IV with the exception that propylene was used as monomer feed. During the course of the reaction propylene was pressured into the reactor at a pressure of 25 p.s.i.g. Reaction was allowed to continue for one hour after which 46 g. of product was recovered. This product consisted of about 26 g. of mixed dimers and about 20 g. of higher oligomers of propylene.

EXAMPLE VI

The operation of Example V was repeated employing the nickel complex of Example III and ethylaluminum dichloride in the same relative proportions. During the course of the reaction 15.5 g. of cyclopentene were fed to the reactor. Reaction was allowed to continue under agitation at a temperature of 0–20° F. for a period of 50 minutes after which 3.0 g. of 1-cyclopentylcyclopentene and 1.2 g. of 1-cyclopentylidenecyclopentane were found to be present on analysis. Additional higher oligomeric products were also observed.

Numerous variations and modifications of the concept of this invention will be apparent to one skilled in the art in view of the foregoing disclosure and the appended claims to this invention, the essence of which is that novel nickel dithiocarbamates suitable for the conversion of olefin hydrocarbons to higher molecular derivatives thereof in combination with organoaluminum halides can be prepared by reacting nickel halides, phosphorus, arsenic or antimony ligand forming materials and either an alkali metal dihydrocarbyldithiocarbamate, an ammonium dihydrocarbyldithiocarbamate or an alkyl ammonium dihydrocarbyldithiocarbamate.

I claim:
1. A nickel compound having the general formula

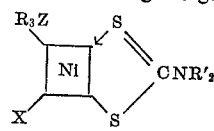

wherein R and R' are selected from the group consisting of alkyl, aryl, cycloalkyl hydrocarbon radicals, and combinations of these, having from 1 to about 12 carbon atoms; Z is selected from the group consisting of phosphorus, arsenic and antimony; and X is halogen.

2. The compound of claim 1 wherein R is selected from the group consisting of phenyl and tri-n-butyl, R' is selected from the group consisting of ethyl and methyl, Z is phosphorus and X is bromine.

3. The compound of claim 1 further comprising in combination an organoaluminum halide having the general formula $$R_aAlX_b$$

wherein R is selected from alkyl, aryl, cycloalkyl hydrocarbon radicals, and combinations of these, having from 1 to about 12 carbon atoms, X is halogen, and the sum of integers $a$ and $b$ equals 3.

4. The composition of claim 3 wherein said organoaluminum halide is selected from the group consisting of ethylaluminum dichloride and diethylaluminum chloride.

5. A method for producing the compound of claim 1 comprising contacting a nickel halide, a ligand of the general formula $$R_3Z$$

wherein Z is selected from the group consisting of phosphorus, arsenic and antimony and R is selected from the group consisting of alkyl, aryl, cycloalkyl, hydrocarbon radicals, and combinations of these, having from 1 to about 12 carbon atoms and a member of the group consisting of alkali metal dihydrocarbyldithiocarbamates, ammonium dihydrocarbyldithiocarbamates and alkylammonium dihydrocarbyldithiocarbamates wherein said hydrocarbon has up to about 12 carbon atoms.

6. The method of claim 5 wherein said nickel halide is selected from the group consisting of nickel chloride, nickel bromide, and nickel iodide, said ligand-forming material is a trihydrocarbylphosphine, said alkali metal is sodium, and said alkyl ammonium dihydrocarbyldithiocarbamate is a dialkylammonium dihydrocarbyldithiocarbamate.

7. The method of claim 6 wherein said alkali metal dihydrocarbyldithiocarbamate is sodium diethyldithiocarbamate trihydrate, and said dialkylammonium dihydrocarbyldithiocarbamate is dimethylammonium dimethyldithiocarbamate.

8. A method of reacting olefin hydrocarbons together to form higher molecular weight derivatives thereof which comprises contacting said olefins with the composition of claim 3.

9. The method of claim 8 wherein said olefin hydrocarbon is a 1-olefin having from about 2 to about 20 carbon atoms.

10. The method of claim 8 wherein the concentration of said nickel compound is within the range of from about 0.001 to about 0.1 mole per mole of said olefin.

11. The method of claim 10 wherein the molar ratio of said organoaluminum halide to said nickel compound is within the range of from about 0.5:1 to about 20:1.

12. The method of claim 8 wherein said nickel compound is selected from the group consisting of diethyldithiocarbamato(triphenylphosphine)bromonickel and diethyldithiocarbamato(tri-n-butylphosphine)bromonickel, said organoaluminum halide is ethylaluminum dichloride, and said olefin hydrocarbon is selected from the group consisting of cyclopentene and propylene.

References Cited

UNITED STATES PATENTS

| | | | |
|---|---|---|---|
| 2,969,408 | 1/1961 | Nowlin et al. | 260—683.15 |
| 3,281,315 | 10/1966 | Sazegar | 424—295 |
| 3,306,948 | 2/1967 | Kealy | 260—680 |
| 3,321,546 | 5/1967 | Roest et al. | 260—683.15 |

PAUL M. COUGHLAN, Jr., *Primary Examiner.*

U.S. Cl. X.R.

252—431; 260—439, 666